Patented Apr. 7, 1942

2,278,539

UNITED STATES PATENT OFFICE 2,278,539

TREATMENT OF RUBBER

Paul M. Elliott, Naugatuck, Conn., assignor to United States Rubber Company, New York, N. Y., a corporation of New Jersey No Drawing. Application July 15, 1939, Serial No. 284,712

4 Claims. (Cl. 260—780)

This invention relates to improvements in the treatment of rubber.

The use of organic ultra-accelerators of vulcanization to shorten the time necessary to effect the vulcanization of rubber compounds has introduced a serious problem in the tendency of such rubber compounds to scorch, that is, to become partially or completely vulcanized during processing or storage before they can be formed into useful products. Accordingly it is an object of the invention to provide a class of chemicals which will serve the function of retarding the accelerated vulcanization of rubber mixes during processing, storing, etc., of such mixes, and then will permit the vulcanization process to take place in substantially normal manner when the rubber mix is finally subjected to suitable conditions of vulcanization. Incorporation in rubber compounds containing ultra-accelerators of vulcanization, like the arylene-thiazyl sulphides, of the chemicals of this invention, reduces the tendency of such stocks to become prematurely vulcanized. At the same time, when the stocks are finally subjected to proper conditions of vulcanization, they vulcanize in substantially normal manner.

The invention broadly comprises incorporating in rubber, prior to vulcanization, a compound having the general formula

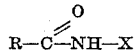

where R is an aryl or heterocyclic group, X is halogen, e. g., chlorine or bromine. R may contain further substituents such as —OH, —COOH, —NO$_2$, —NH$_2$, —halogen, —alkoxy, etc.

Examples of preferred anti-scorches of the present invention are: N-chlorobenzamide, N-chloro-chlorobenzamide, N-chloro-nitrobenzamide, N-chlorotoluamide, N-chlorophthalamides, N-chlorofuramide, N-chloronaphthamides, etc.

The following examples illustrate the effectiveness of the chemicals as anti-scorches, the parts being by weight:

A typical gum stock is prepared containing by weight 100 parts of pale crepe rubber, 10 parts of zinc oxide, 2 parts of stearic acid, 3 parts of sulfur, and 0.5 part of mercaptobenzothiazole. To portions of this stock are added 1.0 part, 1.5 parts, and 2.0 parts respectively of a masterbatch of 90 parts of pale crepe rubber and 10 parts of N-chlorobenzamide. Portions of these stocks, together with portions of the original stock to which no other ingredient has been added, are then heated in a mold for varying times at the temperature of saturated steam at five pounds pressure and at thirty pounds pressure.

Typical tensiles are as follows:

|  | A | B | C | D |
|---|---|---|---|---|
| Pale crepe rubber | 100 | 100 | 100 | 100 |
| Zinc oxide | 10 | 10 | 10 | 10 |
| Stearic acid | 2 | 2 | 2 | 2 |
| Sulfur | 3 | 3 | 3 | 3 |
| Mercaptobenzothiazole | 0.5 | 0.5 | 0.5 | 0.5 |
| 10% N-chlorobenzamide masterbatch | 0 | 0.5 | 1.0 | 1.5 |

GREEN TENSILE

| | | | | |
|---|---|---|---|---|
| 30 at 5#/sq. in. steam pressure | 43 | 34 | 33 | 31 |
| 60 at 5#/sq. in. steam pressure | 964 | 90 | 34 | 34 |
| 30 at 30#/sq. in. steam pressure | 3,000 | 2,400 | 2,100 | 2,100 |
| 60 at 30#/sq. in. steam pressure | 3,500 | 3,400 | 3,100 | 3,200 |
| 90 at 30#/sq. in. steam pressure | 3,100 | 3,400 | 3,200 | 3,100 |

A similar test using N-chloro-p-chlorobenzamide gave results as follows:

|  | A | B | C |
|---|---|---|---|
| Pale crepe rubber | 100 | 100 | 100 |
| Zinc oxide | 10 | 10 | 10 |
| Stearic acid | 2 | 2 | 2 |
| Sulfur | 3 | 3 | 3 |
| Mercaptobenzothiazole | 0.5 | 0.5 | 0.5 |
| 10% N-chloro-p-chloro-benzamide masterbatch | 0 | 0.5 | 1.0 |

GREEN TENSILES

| Cure in minutes: | | | |
|---|---|---|---|
| 60 at 5#/sq. in. steam pressure | 520 | 86 | 40 |
| 75 at 5#/sq. in. steam pressure | 1,500 | 427 | 37 |
| 60 at 30#/sq. in. steam pressure | 3,600 | 3,500 | 3,400 |
| 75 at 30#/sq. in. steam pressure | 3,400 | 3,200 | 3,700 |

It will be noted that the control stocks begin to vulcanize while the treated stocks still show no signs of vulcanization. In the vulcanization tests the treated stocks vulcanize essentially the same as the control stocks.

The proportions of chemicals used are not limited to those given in the above examples. The preferred proportions are from 0.02 part to 1.0 part per 100 parts of rubber but larger or smaller amounts may be used.

The present chemicals may be used in all types of natural rubber including gutta percha, balata, as well as artificially-prepared rubbers, which are capable of being vulcanized similarly to natural rubbers. They may be used in the presence of compounding ingredients in general other than those given in the above examples. The chemicals may also be used in the compounding of latex, cements, dispersions, and various types of solid rubbers whether or not derived directly from latex as by spray drying.

The present chemicals may be made by any of the methods known to the art, and either the resultant crude reaction products or the purified chemical may be used in rubber for the purposes of the present invention.

Having thus described my invention, what I claim and desire to protect by Letters Patent is:

1. A process which comprises incorporating in a vulcanizable rubber stock, an ultra accelerator of vulcanization and in addition a chemical having the general formula

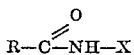

where R is a member of the group consisting of aryl and heterocyclic radicals, and X is chlorine.

2. A vulcanizable rubber composition containing an ultra accelerator of vulcanization and in addition a chemical having the general formula

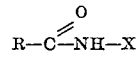

where R is a member of the group consisting of aryl and heterocyclic radicals; X is chlorine.

3. A vulcanizable rubber composition containing an ultra accelerator of vulcanization and in addition N-chlorobenzamide.

4. A process which comprises treating rubber with a mercaptobenzothiazole accelerator and N-chlorobenzamide.

PAUL M. ELLIOTT.